W. S. RUNNELS.
SAWING AND TRIMMING MACHINE.
APPLICATION FILED FEB. 15, 1921.
1,408,831.
Patented Mar. 7, 1922.
2 SHEETS—SHEET 1.
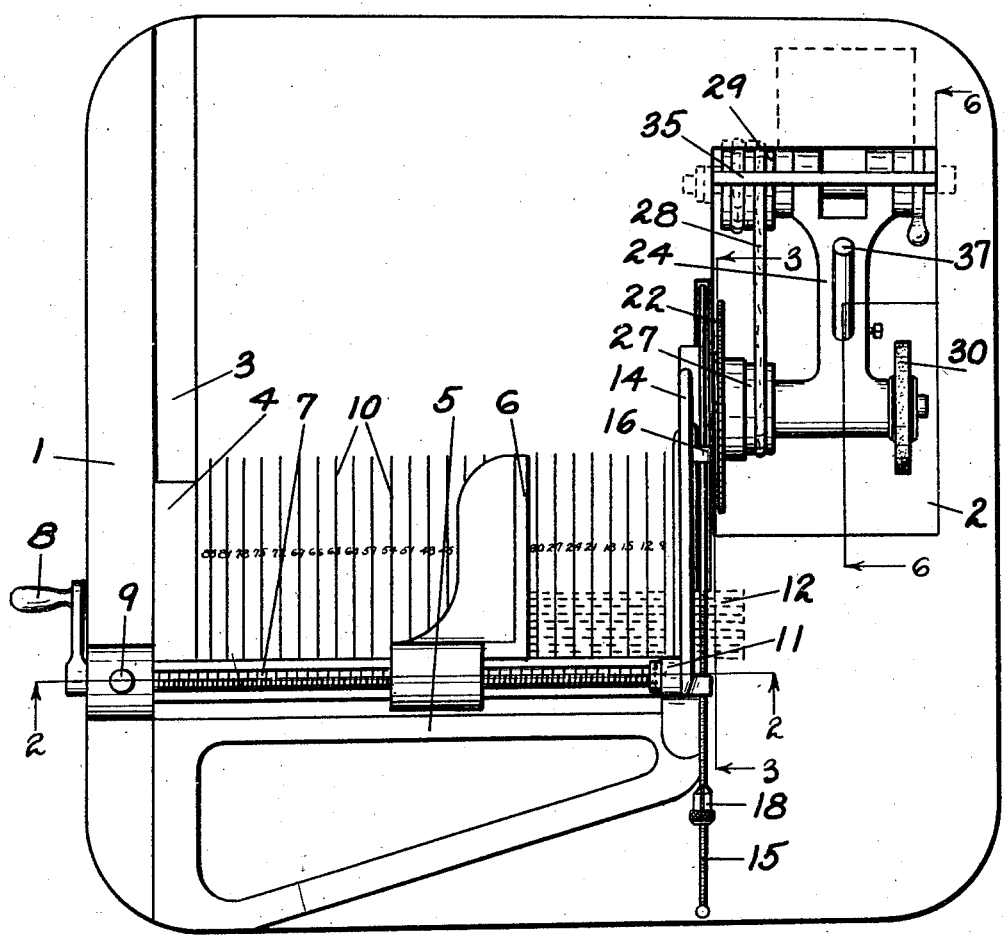
Fig. I.
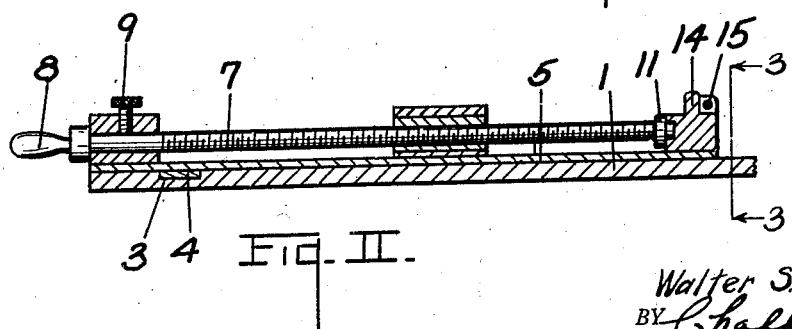
Fig. II.
INVENTOR.
Walter S. Runnels
BY Chappell & Earl
ATTORNEYS.

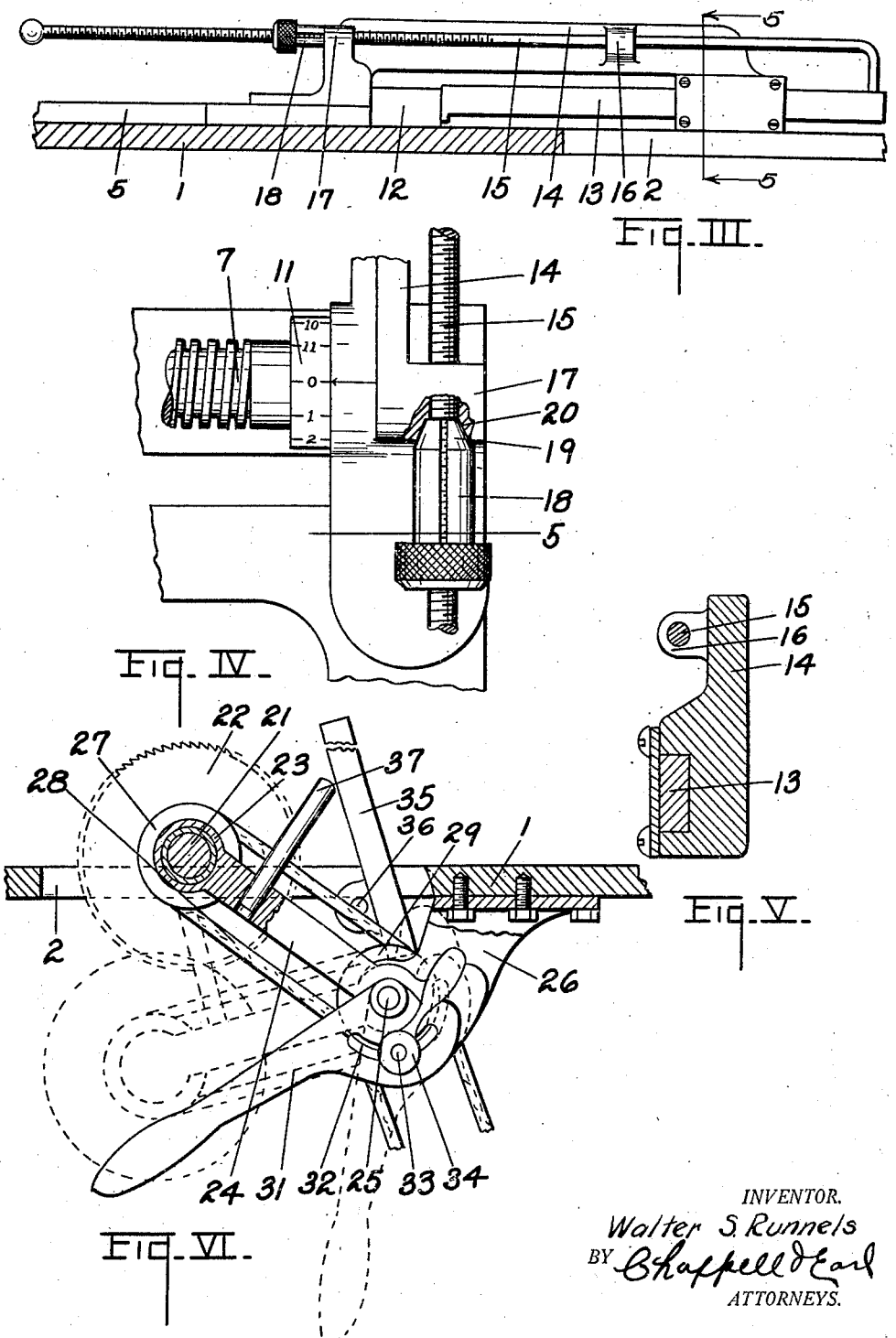

UNITED STATES PATENT OFFICE.

WALTER S. RUNNELS, OF KALAMAZOO, MICHIGAN.

SAWING AND TRIMMING MACHINE.

1,408,831.   Specification of Letters Patent.   Patented Mar. 7, 1922.

Original application filed September 5, 1919, Serial No. 321,911. Divided and this application filed February 15, 1921. Serial No. 445,250.

*To all whom it may concern:*

Be it known that I, WALTER S. RUNNELS, a citizen of the United States, residing at the city and county of Kalamazoo, State of Michigan, have invented certain new and useful Improvements in Sawing and Trimming Machines, of which the following is a specification.

This invention relates to improvements in sawing and trimming machines.

My improved sawing and trimming machine is especially designed by me for use in sawing and trimming electrotypes, stereotypes, linotypes, halftones and the like, and I have illustrated my improvements as I have embodied the same in a machine for that purpose. My improvements are, however, adaptable and desirable for use in machines designed for other work. In a machine for trimming electrotypes and the like I preferably employ the cutters in my application for Letters Patent filed September 5, 1919, Serial No. 321,911, now Patent No. 1,359,748, Nov. 23, 1920, my present application being a division of such application.

The main objects of this invention are:

First, to provide in a sawing and trimming machine an improved gaging and feeding means.

Second, to provide in a sawing and trimming machine an improved work clamping or holding means which may be very rapidly manipulated to clamp or release the work.

Third, to provide an improved sawing and trimming machine which is comparatively simple and economical in structure and very convenient to operate.

Further objects, and objects relating to structural details, will definitely appear from the detailed description to follow.

I accomplish the objects of my invention by the devices and means described in the following specification. The invention is clearly defined and pointed out in the claims.

A structure which is the preferred embodiment of my invention is clearly illustrated in the accompanying drawing forming a part of this specification, in which:

Fig. I is a plan view of my improved sawing and trimming machine, a piece of work being indicated by dotted lines, the saw being shown in its raised or working position.

Fig. II is a detail view partially in vertical section on a line corresponding to line 2—2 of Fig. I showing details of the work gage and support.

Fig. III is a detail view partially in section on a line corresponding to line 3—3 of Figs. I and II showing details of the work holder or clamp.

Fig. IV is an enlarged detail plan view showing further details of the work holder and gage.

Fig. V is a detail section on a line corresponding to line 5—5 of Fig. III.

Fig. VI is a detail vertical section on a line corresponding to broken line 6—6 of Fig. I showing details of the mounting for the saw, parts being shown in their raised position by full lines and in their lowered position by dotted lines.

In the drawing similar reference characters refer to similar parts throughout the several views, and the sectional views are taken looking in the direction of the little arrows at the ends of the section lines.

Referring to the drawing, I have illustrated only the top of the table 1. The table has an opening 2 therein through which the saw may be swung to and from the work. The top has a groove way 3 for the guiding slide 4 of the carriage 5 which travels or slides upon the table being guided in its movement by the slide and way. The gage member 6 rests upon the table in front of the carriage, it being adjustably supported by the screw 7 disposed on the carriage at right angles to the way 3.

The screw has a handle 8 at its outer end and a set screw 9 is provided for securing the screw in its adjusted position. The table is provided with a scale 10 having pica indicating indicia while the screw is provided with a cylindrical indicia member 11 having rotation indicating indicia thereon indicating subdivisions of the gage indicia of the table so that the gage member may be very accurately adjusted to gage and to support the work as 12 which rests on the table in front of the carriage as shown in the drawing.

The work clamping bar 13 is slidably mounted on the forwardly projecting arm 14 of the carriage. The clamping bar 13 is adjustably supported by means of the clamping rod 15 which is arranged through the guide 16 on the arm 14 and a support 17 on the carriage at the rear of the arm. The rod 15 is threaded and provided with a separate clamping nut 18 which is slidable on the rod and has a tapered or conical end 19 coacting with conical recess 20 in the support 17. (See Fig. IV.)

With the parts thus arranged when the nut is released the rod slides freely therein to adjust the gage. The nut may then be pushed forward to engage its conical end with the recess 20 which engages the threads of the screws of the rod so that when the nut is turned the bar is clamped against the work. The clamp, however, is quickly released by unscrewing the nut sufficiently to free its conical end from the recess 20.

The arbor 21 of the saw 22 is carried in a bearing 23 at the outer end of the arm 24. This arm 24 is fixed to a rock shaft 25 carried by the bracket 26 on the underside of the table. The arbor is provided with a pulley 27 connected by the belt 28 to the driving pulley 29 on the rock shaft 25. The arbor is preferably provided with a combined saw and cutter of my said application, and also with a grinding wheel 30.

The rock shaft 25 is provided with an actuating lever 31 which has a segmental slot 32 to receive the clamping pin 33 for clamping nut 34 so that the rock shaft may be clamped to support the arbor in the position desired.

I provide a cover 35 which is pivoted at 36 to swing upwardly, the arm 24 being provided with a post 37 which raises the cover and supports it in its raised or open position.

My improved sawing and trimming machine is very simple in its operation or manipulation, and enables very rapid work.

I have not attempted to illustrate or describe certain modifications or adaptations which I contemplate as I believe the disclosure made will enable those skilled in the arts to which my invention relates to embody or adapt same as may be desired.

Having thus described my invention, what I claim as new and desire to secure by Letters Patent is:

1. In a sawing and trimming machine, the combination of a table having a groove-like way therein, a carriage slidable on said table and having a slide engaging said way, a gage screw mounted on said carriage at right angles to its line of travel, a gage member on said screw resting on said table in front of said carriage, a forwardly projecting arm at the inner end of said carriage, a clamping bar slidable therein adapted to clamp the work against the carriage, a threaded adjusting rod for said clamping bar slidably mounted on said carriage, a split nut slidable on said adjusting rod and having a conical end, and a conical recess in said carriage coacting with the conical end of said nut to force the same into operative engagement with the threads of said rod.

2. In a structure of the class described, the combination of a table, a carriage slidable on said table, a gage screw mounted on said carriage, a gage member on said screw resting on said table in front of said carriage, a forwardly projecting arm at the inner end of said carriage, a clamping bar slidable therein adapted to clamp the work against the carriage, a threaded adjusting rod for said clamping bar slidably mounted on said carriage, a split nut slidable on said adjusting rod and having a conical end, and a conical recess in said carriage coacting with the conical end of said nut to force the same into operative engagement with the threads of said rod.

3. In a sawing and trimming machine, the combination of a table, of a saw and cutter, a carriage, a gage screw mounted on said carriage, a gage member on said screw, a slidable clamping member adapted to clamp the work against the carriage, a threaded adjusting rod for said clamping bar slidably mounted on said carriage, and a split clamping nut on said adjusting rod.

4. In a sawing and trimming machine, the combination of a table having a groove-like way therein, a carriage slidable on said table and having a slide engaging said way, a gage screw mounted on said carriage at right angles to its line of travel, a gage member on said screw resting on said table in front of said carriage, said table being provided with gage indicia operatively associated with said gage member, said screw being provided with rotation indicating indicia indicating subdivisions of said gage indicia on said table.

5. In a structure of the class described, the combination of a table, a carriage slidable on said table, a gage screw mounted on said carriage, a gage member on said screw resting on said table in front of said carriage, said table being provided with a gage indicia operatively associated with said gage member, said screw being provided with rotation indicating indicia indicating subdivisions of said gage indicia on said table.

6. In a sawing and trimming machine, the combination of a table, of a saw and cutter, a carriage, a gage screw mounted on said carriage, and a gage member on said screw, said table being provided with gage indicia operatively associated with said gage member, said screw being provided with rotation indicating indicia indicating subdivisions of said gage indicia on said table.

7. In a machine of the class described, the combination of a table having an opening therein, a carriage on said table provided with work gaging and clamping means, a rock shaft provided with an adjusting lever and means for securing it in its adjusted positions, an arbor supporting arm on said rock shaft, an arbor carried by said arm and provided with a pulley, a driving pulley on said rock shaft having driving connections with said arbor pulley, a saw and cutter mounted on said arbor adapted to be swung through the opening in said table, a cover for said opening, and a post on said arm adapted to engage said cover to open and to support it in its open position.

8. In a machine of the class described, the combination of a table having an opening therein, a carriage on said table provided with work gaging and clamping means, a rock shaft provided with an adjusting lever and means for securing it in its adjusted positions, an arbor supporting arm on said rock shaft, an arbor carried by said arm and provided with a pulley, a driving pulley on said rock shaft having driving connections with said arbor pulley, and a saw and cutter mounted on said arbor adapted to be swung through the opening in said table.

9. In a machine of the class described, the combination of a table having an opening therein, a carriage on said table provided with work gaging and clamping means, a rock shaft provided with an adjusting lever and means for securing it in its adjusted positions, an arbor supporting arm on said rock shaft, an arbor carried by said arm and provided with a pulley, a driving pulley on said rock shaft having driving connections with said arbor pulley, a tool mounted on said arbor adapted to be swung through the opening in said table, a cover for said opening, and a post on said arm adapted to engage said cover to open and to support it in its open position.

In witness whereof, I have hereunto set my hand and seal in the presence of two witnesses.

WALTER S. RUNNELS. [L. S.]

Witnesses:
  LUELLA G. GREENFIELD,
  MARGARET L. GLASGOW.